United States Patent

[11] 3,615,329

| | | |
|---|---|---|
| [72] | Inventor | Robert R. Jones, Jr.<br>Salt Lake City, Utah |
| [21] | Appl. No. | 808,136 |
| [22] | Filed | Mar. 18, 1969 |
| [45] | Patented | Oct. 26, 1971 |
| [73] | Assignee | American Smelting and Refining Company<br>New York, N.Y. |

[54] A RECIRCULATORY SYSTEM FOR THE GRANULATION OF MOLTEN SLAG
10 Claims, 13 Drawing Figs.

[52] U.S. Cl.................................................. 65/141,
65/19, 241/1, 241/DIG. 13, 241/DIG. 21
[51] Int. Cl........................................................ C03b 5/22,
B02c 19/00
[50] Field of Search.......................................... 210/512;
241/1, DIG. 13, DIG. 21; 65/19, 141

[56] References Cited
UNITED STATES PATENTS

| 3,523,015 | 8/1970 | Grady | 65/19 |
|---|---|---|---|
| 3,316,075 | 4/1967 | Grady | 65/19 |
| 3,235,090 | 2/1966 | Bose et al. | 210/512 |

Primary Examiner—S. Leon Bashore
Assistant Examiner—Saul R. Friedman
Attorneys—Elwood J. Schaffer and Roger J. Drew

ABSTRACT: A recirculatory system for granulating molten slag comprising water jet nozzle granulators and a receptacle which contains a settling separation section wherein the coarse slag particles are separated from the water of elevated temperature containing fine slag particles suspended therein. The fine slag particles are removed from the water by use of one or more hydrocyclones. Conduits conduct the fine slag particle-free water of elevated temperature from the hydrocyclones to a cooling tower which cools the water. Conduits then conduct the cool water back to the jet nozzles.

INVENTOR
Robert R. Jones, Jr.
BY
ATTORNEY

A RECIRCULATORY SYSTEM FOR THE GRANULATION OF MOLTEN SLAG

BACKGROUND OF THE INVENTION

1. Field of the Invention

This invention relates to the granulation of slag and more especially to a new and improved recirculatory system and method for granulating slag.

2. Description of the Prior Art

Slag from various processes for the removal of copper, lead and zinc from its ore is suitable for use for a variety of purposes, for example railroad roadbed construction, as concrete aggregate and roofing granules, for road surfacing when combined with a binder, and for fertilizers. For convenient handling and processing for each of these applications, it is necessary that the slag be reduced to particulate size.

There are three general processes used for the granulation of molten materials such as slag. These are referred to as the dry process, pit process and the jet process. Sometimes the process is a combination of the pit and jet process. The dry process involves the use of a rapidly revolving disc onto which a small stream of the molten material is poured through a chilling jet of water. The quantity of water is just enough to chill the molten material to a nonsticky state and to break it up into small globules. The revolving disc sprays the product radially in small particles, and there is sufficient intrinsic heat to evaporate excess water.

In the pit process the usual practice is to pour a small stream of the molten slag or other material through nozzles or screens into a pit filled with water. This process is most commonly used in the production of shot from metals, although it is also used in the removal of slag from coal fired boilers. Because of explosion hazards, and the extensive reclaiming system required, this method is rarely used if large volumes of slag are to be granulated. This is particularly true if there is a possibility of the entrainment of pure metal or metallic oxides in the slag. It is not used in the granulation of nonferrous mattes and speiss.

In the jet process a controlled stream of molten slag is poured from a launder or spout and is intercepted by one or more jets of cooling water. Some steam is produced, with the quantity of steam depending on the volume and temperature of the water. The steam contributes to the dissipation of the heat. After deducting the steam, the water should have enough volume to chill the molten slag to a temperature at which it will not be sticky to prevent agglomeration into a plastic mass that may present operating difficulties and hazards.

Systems for granulating molten nonferrous metal slag have employed recirculation of the granulating water, after granulated slag separation and cooling of the water, to the granulating means. The water recirculation is especially important in those areas of the country where water is normally scarce, and in other areas during periods of water shortage. In connection with the recirculation, it is important that the large quantities of fine slag particles or slag fines, which tend to remain suspended in the granulating water after separation of the coarse slag particles, be separated from the water prior to its circulation back to the granulating means. If not separated, the slag fines fill sumps and equipment as sludge resulting in impairment of operations. Further the slag fines may plug water distribution nozzles and granulating jet nozzle openings.

In the past, systems for granulating molten slag in the nonferrous metal industry employed large open cooling and settling ponds for cooling the heated water from the granulating operation and separating from the water the particulate slag including the slag fines, with the cooled and substantially slag particle-free water being recirculated and reused for granulating molten slag. To accomplish slag fines separation from the water, the cooling ponds had to be made sufficiently large to obtain gravity settling of the fines, and the bottom of the ponds had to be periodically scraped by means of a dragline scraper or another scraping arrangement for removal of the fines. The large size of the cooling and settling ponds are illustrated by the dimensions of a typical pond, which are length of 600 feet, width of 100 feet and depth of 5 feet. One prior cooling and settling pond arrangement involves the use of two ponds, with use of the ponds on an alternating basis. While one pond is being filled with the granulated slag for particulate slag settling separation and water cooling, the other is being drained of water which may require 12 hours and the slag removed by a dragline scraper which may require as long as 8 hours. Although the prior cooling and settling pond arrangement is satisfactory in certain respects, considerable expense and space requirements are involved in the construction of the large ponds, and the pond-bottom scraping arrangement tends to be awkward and slow. Moreover the bottom scraping arrangement involves an expensive labor requirement for operation of the scraper.

SUMMARY OF THE INVENTION

In accordance with the present invention, I have found that a considerably improved recirculatory slag granulating system and method is attained by employing therein in place of the large cooling pond or ponds and bottom scraping arrangement for slag fines removal, one or more hydrocyclones in combination with a cooling tower with the hydrocyclone or hydrocyclones located upstream of the tower, thereby effecting continuously the removal of the fine slag particles from the aqueous liquid or water of elevated temperature prior to its introduction into the tower. The system and method constitutes a considerable improvement in this art by reasons of (1) appreciably more economical and efficient than the prior granulating systems requiring the large ponds together with the bottom scraping arrangement; (2) considerable reduction in space requirements by reason of the employment of the relatively small and compact hydrocyclone or hydrocyclones; and (3) appreciably reduced labor costs which is important in connection with (1) supra.

The method of the present invention, which is a recirculatory method, in its broader aspects involves granulating the molten slag with the aid of a cooling aqueous liquid, usually water, thereby to obtain a mixture of the water at elevated temperature and granulated slag particles. The water of elevated temperature contains fine slag particles suspended therein and is separated from the coarse slag particles. The separated water of elevated temperature and containing the fine slag particles suspended therein is then passed at a rapid flow rate to one or more hydrocyclonic separating zones and introduced tangentially therein. The fine slag particles are cyclonically separated from the water in the hydrocyclonic separating zone. The substantially slag particle-free water of elevated temperature is withdrawn from the hydrocyclonic separating zone or zones and introduced into a cooling tower above the filling material therein. Cooled aqueous liquid is withdrawn from a lower portion of the cooling tower and returned to the granulating step for further granulating of the molten slag.

In a preferred embodiment, a plurality of hydrocyclones, for example 2, 3, 4, or more hydrocyclones, are mounted in parallel upstream of the cooling tower, with valve means provided in the water suspending fine slag particle-conducting conduit means for the hydrocyclones whereby any one, combination of any two or more but less than all when more than two hydrocyclones are utilized, or all of the hydrocyclones can be placed on stream as required or desired. This embodiment is preferred by reasons of added flexibility in operation of the granulating system whereby flow rates through individual cyclones can be adjusted to obtain optimum separation of particulate slag from the water during variations in load on the system and variations in characteristics of the materials being processed. Further, with the plurality of hydrocyclones, the shutdown for repair or replacement of one cyclone can be effected without the necessity of having to shut down the entire granulating system. The remaining "on-stream" cyclones serve to take over the load from the shutdown cyclone. This can be an important consideration. Moreover, the multiple hydrocyclones provide for "trimming" or adjusting the operation for the greatest efficiency. In designing a new slag granulating system, it is virtually impossible to predict the best operating conditions with respect to flow rates, quantity of slag fines, and water temperature. With a plurality of hydrocyclones, one or more hydrocyclones can be cut out of or removed from the circuit to thereby increase the separating efficiency; or conversely one or more hydrocyclones can be added if the volume of slag fines-containing water proves to be greater than estimated at the time of design. Although one hydrocyclone will work in the present invention with satisfactory results, the multiple or plurality of hydrocyclones of this embodiment provide a more practical arrangement. Excellent results have been attained herein with the employment of three hydrocyclones mounted in parallel.

The method of this invention is preferably a jet recirculatory method wherein one or more jet streams of water are employed for granulating the molten slag, by being injected into a stream of the molten slag at a sufficiently high velocity and in sufficient quantity to granulate the molten slag.

BRIEF DESCRIPTION OF THE DRAWINGS

Reference is now made to the accompanying drawings wherein.

DETAILED DESCRIPTION OF THE DRAWINGS

Figure 1:
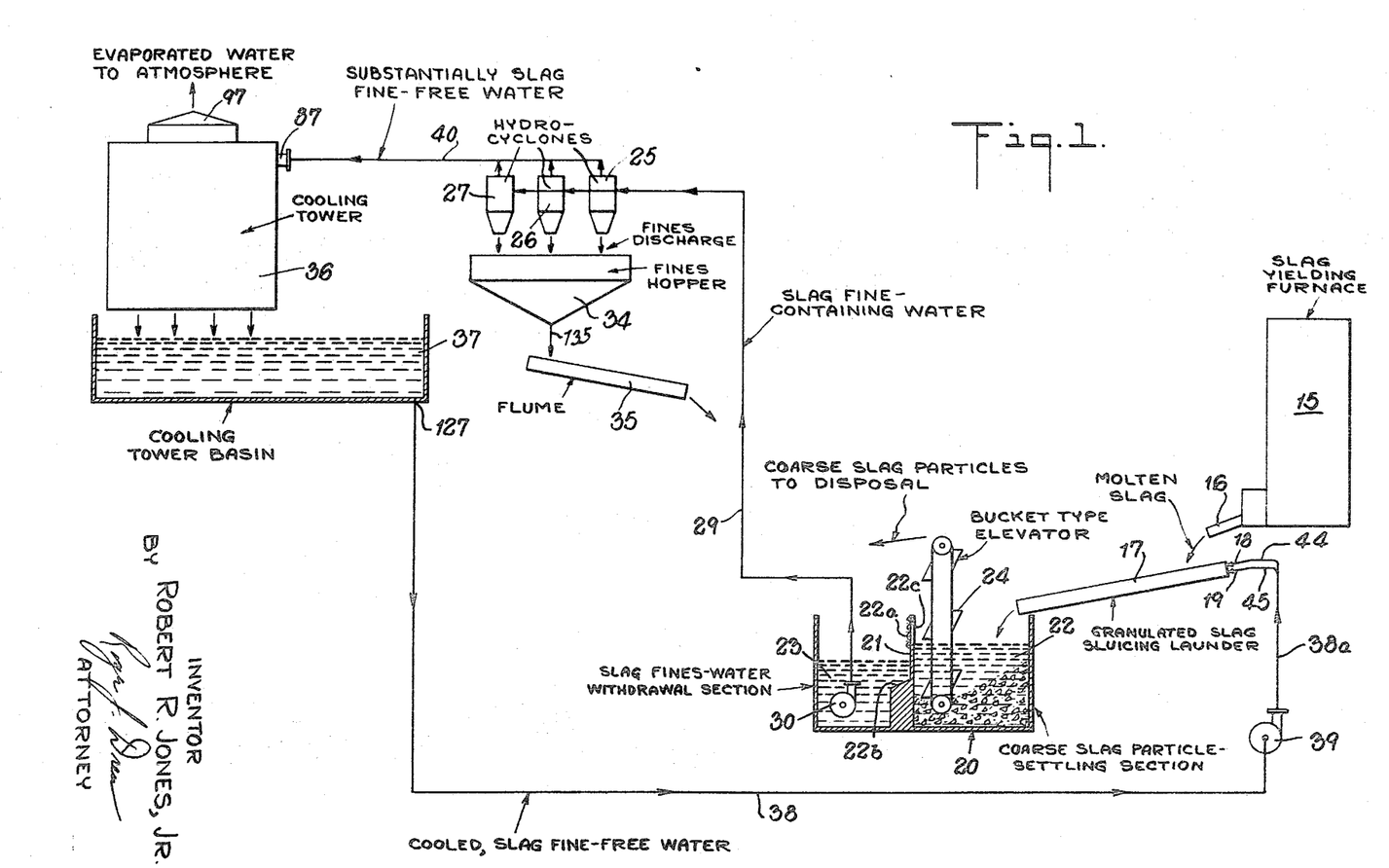
FIG. 1 is a schematic plan view of a recirculatory slag granulating system of the present invention.

With reference to FIG. 1, slag-yielding furnace 15, for instance a nonferrous metal smelting furnace, e.g. a lead blast furnace, is equipped with discharge launder 16 for molten slag, granulated slag sluicing launder 17, and water jet nozzles 18 and 19 for slag granulation. Receptacle 20 has vertical barrier wall 21 therein dividing receptacle 20 into settling separation section or pit 22 for coarse slag particles, and withdrawal section 23 for water of elevated temperature containing fine slag solid particles suspended therein. Preferably wall 21 is equipped with one or more screened overflow discharge openings for water from pit 22. As shown, screen 22a is secured over overflow discharge opening 22c in wall 21 and has openings therein of a sieve size permitting the passage therethrough of fine slag particles of a typical particle size which pass through a 200 mesh to 20 mesh sieve, but preventing coarse slag particles and debris which may include tramp iron and of typical particle size which are retained on a 200 to 20 mesh sieve from passing therethrough and into withdrawal section 23, where the coarse particles and debris could damage the pumps. As shown, trough 22b is provided within withdrawal section 23 to conduct the gritty or slag fines-containing water discharged from separation section 22 into the main part of withdrawal section 23. Bucket-type elevator 24 removes the coarse slag solid particles from settling separation section 22 for further treatment, for instance sintering, or use as desired.

Figure 2:
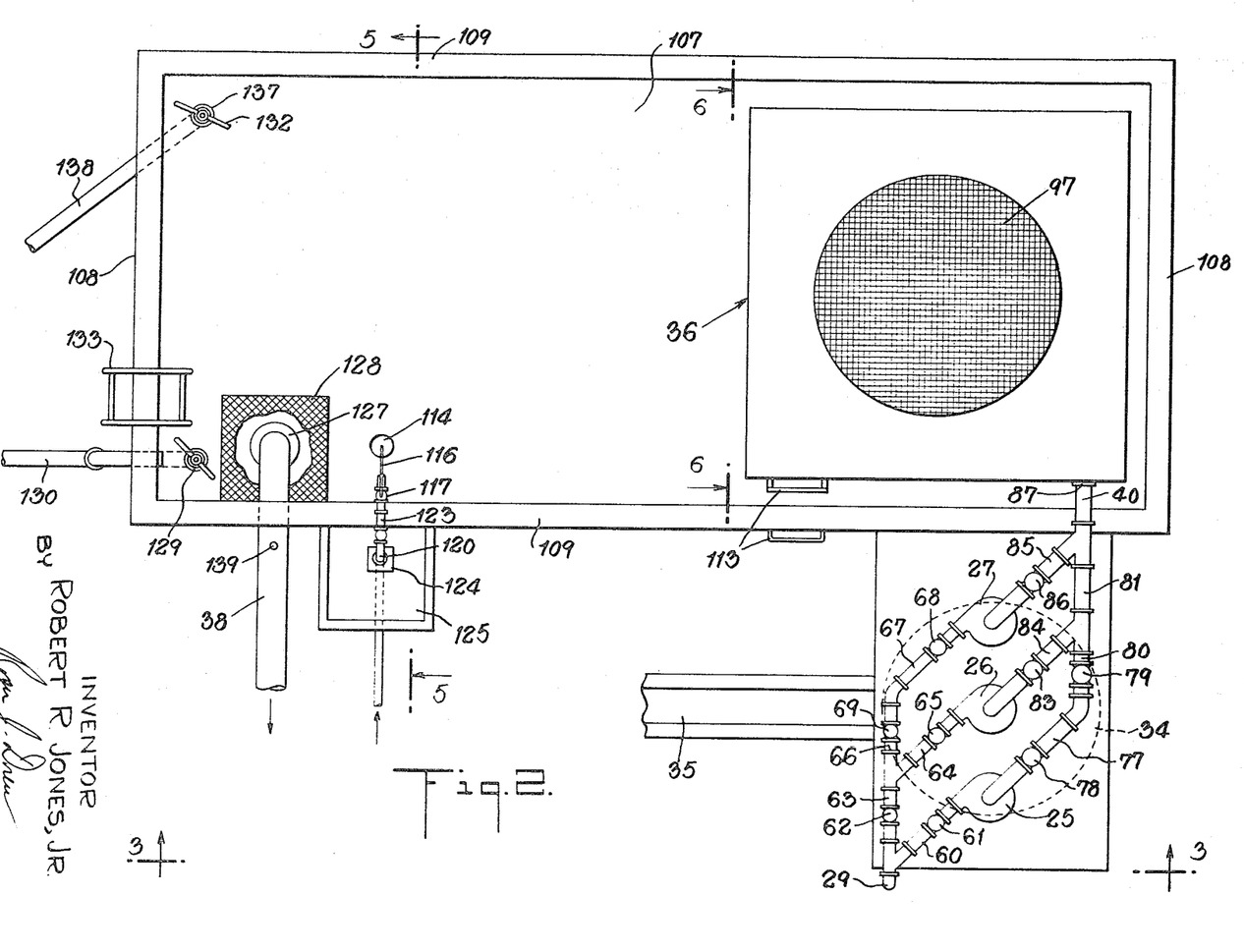
FIG. 2 is a top plan view of the hydrocyclones and cooling tower including the tower basin of the system of this invention.

Hydrocyclones 25, 26 and 27 mounted in parallel are supplied water of elevated temperature and containing the fine slag particles suspended therein from withdrawal section 23 of receptacle 20 via conduit 29 and by means of one or more pump 30. When all of the hydrocyclones 25, 26 and 27 are operating simultaneously, the back pressure created may require the use of more than one pump 30 to maintain an adequate water flow through conduit 29. Valves 61, 65 and 68, shown in FIG. 2, are provided in the conduits to the tangentially arranged inlets of hydrocyclones 25, 26 and 27 whereby any one, a combination of any two, or all of the hydrocyclones can be placed on stream, as may be required or desired. The hydrocyclones or hydrocyclones receive the water of elevated temperature containing the fine slag solid particles suspended therein from withdrawal section 23 and separate substantially the fine slag solid particles therefrom prior to the introduction of the water into the cooling tower. A small amount of the finer slag solid particles may still remain in the water after it leaves the hydrocyclones. Hopper 34 disposed beneath the hydrocyclones receives and collects the separated fine slag solid particles or grit discharged from the hydrocyclones usually together with a small amount of water, and flume 35 transports the slag grit to the treatment, for instance sintering, or disposal area. Cooling tower 36, which was an induced draft cooling tower, receives the water of elevated temperature and free or substantially free of fine slag solid particles through conduit 40. The cooled water discharges from the lower portion of tower 36 into basin or sump 37, whence it is returned to jet nozzles 18 and 19 for slag granulation via conduit 38 and by means of one or more pump 39.

Figure 9:
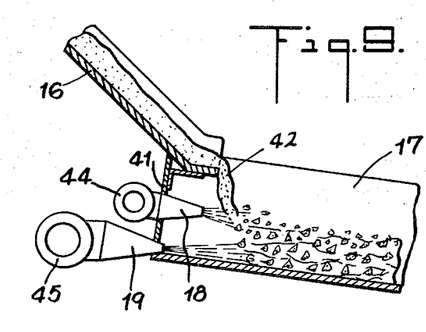
FIG. 9 is a longitudinal fragmentary sectional view taken through the jet granulating nozzles and the upper portion of the granulated slag sluicing launder, showing diagrammatically the granulation of the molten slag from the furnace by the jet cooling water streams from the nozzles.
Figure 10:
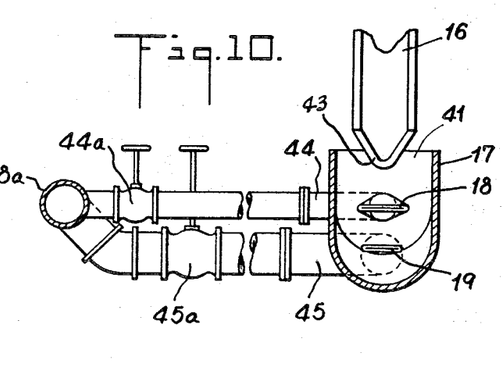
FIG. 10 is a transverse section through an upper portion of the granulated slag sluicing launder adjacent the jet granulating nozzles.

Referring now to FIGS. 9 and 10, jet granulating nozzles 18 and 19 intersect end wall 41 of granulated slag sluicing launder 17. Launder 16 supplies a stream of molten slag 42 from furnace 15, shown in FIG. 1. Jet nozzle 18 injects a jet stream of cooling water within launder 17 with a trajectory intercepting the path of molten slag stream 42, after it flows over lip 43 of launder 16 and before it contacts the lower portion of sluicing launder 17, at a sufficiently high velocity and in sufficient quantity to granulate the molten slag into particles. The primary function of the jet stream from the uppermost nozzle 18 is to granulate the slag, while the primary function of the stream from lower nozzle 19 is to provide a flowing film of water along the bottom of launder 17 to convey the granulated slag particles toward pit 22. Cooled water is supplied jet nozzles 18 and 19 by conduits 44 and 45 equipped with valves 44a and 45a respectively. Jet nozzles 18 and 19 were fabricated of mild carbon steel with nozzle 18 having a water discharge opening of dimensions three-eighth inch by 8 inches and nozzle 19 having a water discharge opening of dimensions of one-half inch by 8⅞ inches curved to fit inside the bottom of launder 17. Granulated slag sluicing launder 17 has a sufficient slope downwardly in the direction of the coarse slag particle-setting separation section or pit 22 of receptacle 20, as shown in FIG. 1, to assure the passage of the mixture of hot water and coarse and fine slag particles therein down its entire length for discharge from the lower end of the launder, which lower end is positioned directly over settling separation section 22, and into the separation section 22. Granulated slag sluicing launder 17 was fabricated of nickel cast iron and had dimensions of 18 inches in width and 9 inches in depth, and a slope of 1½ inches in 12 inches.

Figure 11:
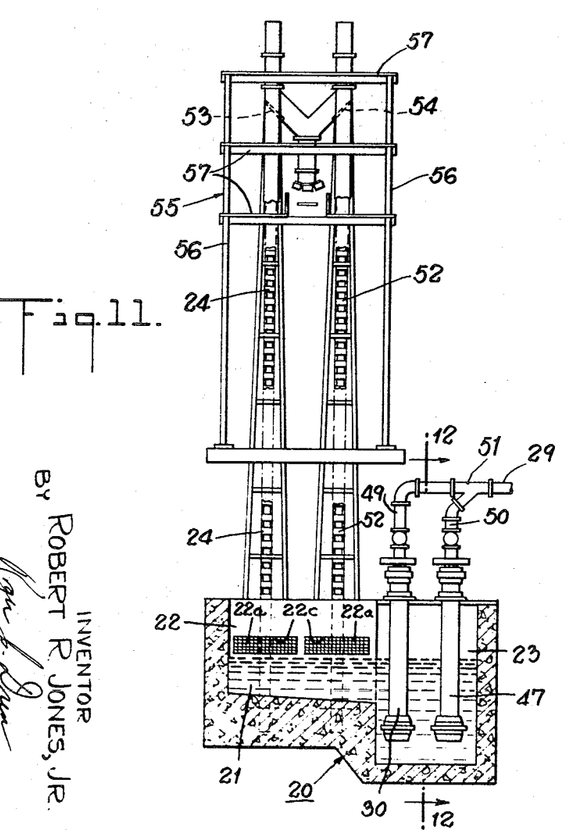
FIG. 11 is a side elevational view partially in section showing the coarse slag particle settling separation section, and the fine slag particle-suspending water withdrawal section of the receptacle, and also showing the bucket-type elevators for removal of the coarse slag particles from the settling separation section.
Figure 12:
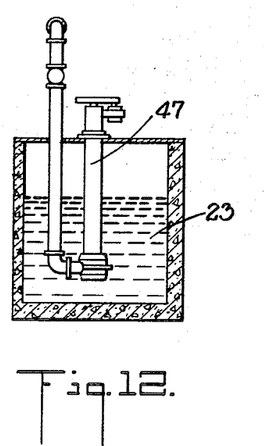
FIG. 12 is a sectional view looking along lines 12—12 of FIG. 11.

With reference to FIG. 11, receptacle 20 comprises settling separation section or pit 22 for coarse slag solid particles and withdrawal section 23 for water of elevated temperature containing fine slag solid particles suspended therein. Vertical barrier wall 21 is preferably equipped with screens 22a, shown in FIG. 1, secured over water-overflow discharge openings 22c in the upper portion of wall 21, wall 21 separating settling separation section 22 and withdrawal section 23. The relatively coarse or larger slag particles settle to the bottom of separation section 22 by reason of their higher specific gravities, and the relatively fine or smaller slag particles remain suspended in the water with usually some fine slag particles floating on the water surface. The elevated temperature water together with the fine slag particles overflows through the screened discharge openings 22c in wall 21 and into withdrawal section 23. Sump pumps 30 and 47, disposed in withdrawal section 23, pump the water of elevated temperature containing the fine slag solid particles suspended therein from withdrawal section 23 through separate conduits 49 and 50 connected by Y branch 51 to common conduit 29 and through conduit 29 to any one, the combination of any two, or all of hydrocyclones 25, 26 and 27, shown in FIG. 1, as required or desired. The arrangement of the sump pumps in withdrawal section 23 is also shown in FIG. 12 with sump pump 30 not shown in FIG. 12 but shown in FIG. 11 being disposed in withdrawal section 23 similarly as sump pump 47. Settling separation section 22, barrier overflow wall 21 and withdrawal section 23 are constructed of reinforced concrete. Screen or grating 22a, shown in FIG. 1, secured over overflow discharge openings 22c is fabricated of steel and consists of parallel plate vertical or upright bars each of three-sixteenth inch thickness by three-fourth inch in width with the center or longitudinal axis of each bar spaced seven-sixteenth inch apart, such bars being retained in position by spaced apart horizontal bars welded across the first-mentioned bars. The dimensions of coarse slag settling separation chamber 22 are 12 feet 8 inches in width by 12 feet 4 inches in length by 13 feet 8 inches in depth, and the dimensions of withdrawal section 23 are 14 feet 4 inches in length by 9 feet 8 inches in width by 16 feet 6 inches in depth. Sump pumps 47 and 30 were "Worthington" vertical sump pumps capable of pumping 995 maximum gallons per minute at a 100-foot head with each pump having a 40 hp. motor drive unit.

Bucket-type elevators 24 and 52, shown in FIG. 11, are disposed in an upright position side by side with the lower portion of each extending within the lower portion of settling separation section or pit 22, and serve to remove the coarse slag particles from the settling separation section or pit 22. Bucket-type elevators 24 and 52 discharge the coarse slag granules onto inclined tiltable platforms or flop gates 53 and 54 whereby the coarse granulated slag is supplied to a slag bin (not shown). From the slag bin the granulated slag can be conducted on a conveyor belt to a sintering plant or taken elsewhere and treated or utilized as desired. Frame 55 comprising vertical members 56 and horizontal bracing members 57 function to support bucket elevators 24 and 52 as well as the slag bin. Bucket-type elevators 24 and 52 each have a capacity of 27 tons per hour when the material to be handled weighs 130 lbs. per cubic foot, and operate at a velocity of 106 feet per minute. Each elevator is driven by a chain drive with sprockets of dimensions of 26.96 inches pitch diameter and with a 15 hp. motor drive for the sprockets. The buckets of each elevator had 12 inches spacings between the buckets, with the ends of the buckets perforated for water discharge, and the elevators were constructed of abrasion resistant steel.

Figures 4, 5:
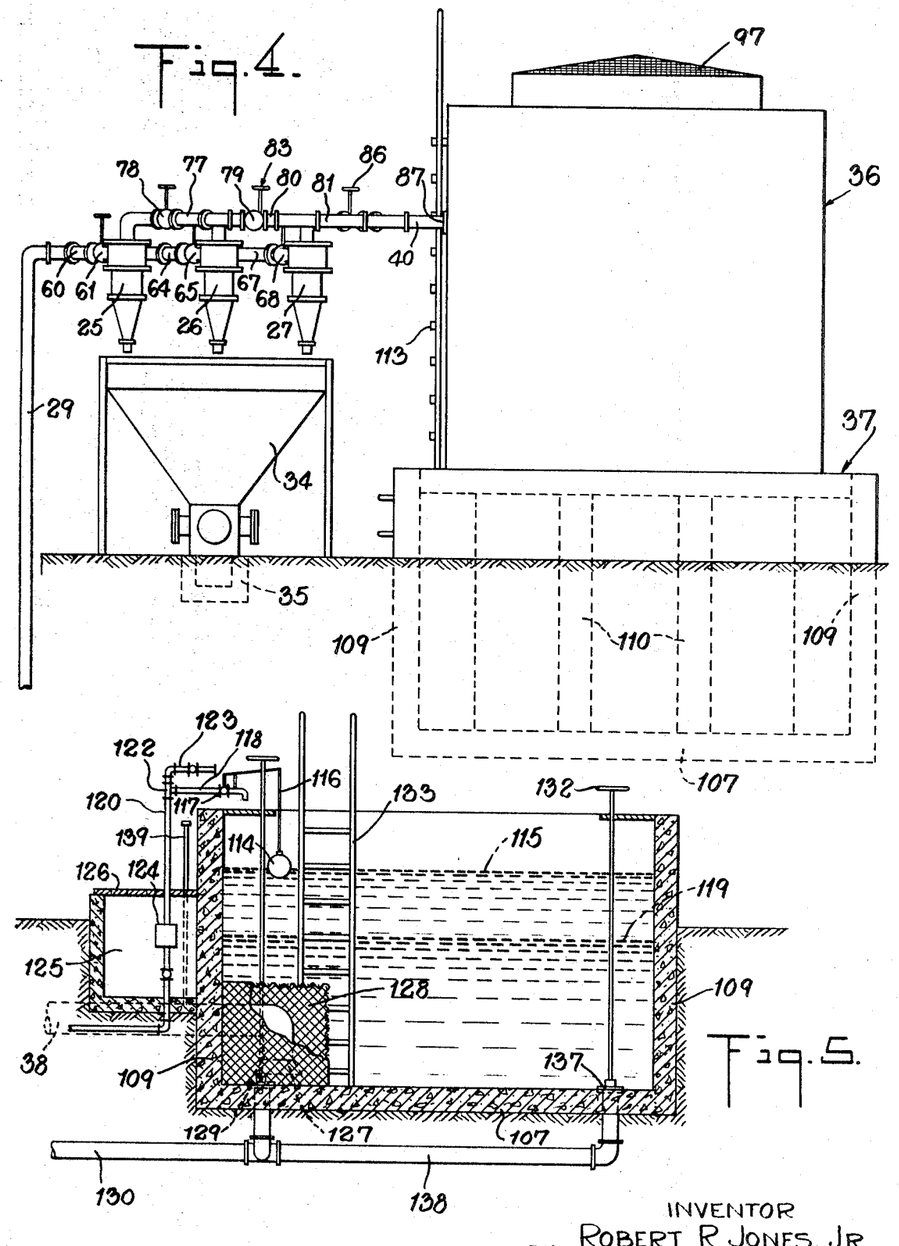
FIG. 4 is an end elevational view of the hydrocyclones and cooling tower of FIG. 2, looking from the right hand side of FIG. 2.
FIG. 5 is a transverse sectional view looking along line 5—5 of FIG. 2.
Figure 7:
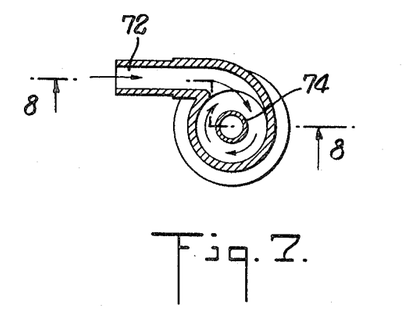
FIG. 7 is a transverse section through a hydrocyclone of the present invention and taken on line 7—7 of FIG. 8.

Referring now to FIGS. 2 and 4, hydrocyclones 25, 26 and 27 are mounted above slag fines or grit hopper 34 and serve to separate the fine slag solid particles from the water of elevated temperature from withdrawal section 23 of receptacle 20, prior to its introduction into cooling tower 36. Hydrocyclones 25, 26 and 27 were Krebs-type hydrocyclones, Model D-10-LB. Hydrocyclones 25, 26 and 27 are mounted in parallel, with common conduit 29, supplying the fine slag particle-suspending water from the withdrawal section 23 of receptacle 20, being connected to the tangentially-arranged inlet therefor of hydrocyclone 25 by valved conduit 60 which in turn is connected to common conduit 29 by an appropriate Y branch fitting. Conduit 60 is equipped with valve 61. Hydrocyclone 26 is connected to common supply conduit 29 through reducer 62, conduit 63 and valved conduit 64 equipped with valve 65 and connected to conduit 63 by a Y branch. Hydrocyclone 27 is in turn connected to conduit 66 through valved conduit 67 equipped with valve 68 and reducer 69, conduit 66 being connected to conduit 63 through the Y branch, whereby hydrocyclone 27 can be supplied with the water of elevated temperature suspending the fine slag solid particles from common supply conduit 29. As shown in detail in FIG. 8, each of hydrocyclones 25, 26 and 27 have cylindrical upper portion 70, conical lower portion 71, inlet 72 for the water containing the suspended fine slag solid particles, an outlet duct 73 extending axially downwardly within cylindrical upper portion 70 and terminating in inlet opening 74 therefor, and outlet 75 for separated fine slag solid particles usually together with a small amount of water. As shown in FIG. 7, inlet 72 for the water suspending the fine slag solid particles is tangentially arranged at the upper portion 70 of the hydrocyclone. Referring again to FIG. 2, hydrocyclone 25 discharges elevated temperature water substantially free of fine slag solid particles through valved conduit 77 equipped with valve 78, conduit 77 being connected by an elbow and reducer 79 connected backwards to function as an "increaser" to conduit 80 of larger diameter than conduit 77. Conduit 80 is connected to conduit 81 by a Y branch fitting. Hydrocyclone 26 has its outlet for elevated temperature water substantially free of fine slag solid particles connected to conduit 81 through a Y branch by valved conduit 84 equipped with valve 83; and hydrocyclone 27 has its outlet for elevated temperature water substantially free of fine slag solid particles connected to common conduit 40 through a Y branch by valved conduit 85 equipped with valve 86. Conduit 81 is connected to conduit 85 and conduit 40 by the Y branch. The hydrocyclones each have dimensions of a 10-inch diameter cylindrical upper portion, a 4-inch diameter inlet and a 5-inch diameter outlet.

Cooling tower 36, which was an induced draft-type cooling tower and specifically a Fluor Type 30 tower, is supplied the water of elevated temperature and substantially free of fine slag solid particles at its inlet 87 therefor located above the filling material in the tower, by common supply conduit 40. This cooling tower had a capacity of 950 gallons per minute and was capable of cooling water from an inlet temperature of 140° F. to a discharge or final water temperature of 104° F. As shown in detail in FIG. 13, induced draft cooling tower 36 includes inlet 87 for the water of elevated temperature and substantially free of fine slag particles communicating with water distributor pipe 88 having a plurality of the outlet nozzle 89, such nozzles being spaced apart from each other for distributing the water onto filling material 90. Filling material 90 was constituted of a grid or checkerwork of narrowly spaced apart plastic "Poly-Grid" strips or slats standing on edge, with layers of the strips superposed on each other, and with slats of each layer parallel and running in the same direction and with slats of contiguous layers arranged substantially at right angles to each other. Fan 92, driven by motor 93 through drive shaft and gear box 94 and 95 respectively, is mounted on deck 96 in the upper portion of the tower as is motor 93. Wire mesh screen 97 serves as a fan guard, and cylindrical upright wall 98 also mounted on deck 96 surrounds the outlet for the exiting higher temperature air and moisture from the tower. Vertical structural support members are designated at 99, with horizontal support members 100 secured thereto by bolting and provided about the entirety of the tower to support deck 96. Horizontal support members 101 are also provided about the entirety of the tower with certain of support members 101 serving to support the water distributing system including distributing pipe 88 with the aid of suitable connectors secured to support member 101 and distributing pipe 88. Horizontal support member 102 serve to support the grid of the filling material.

Figure 13:
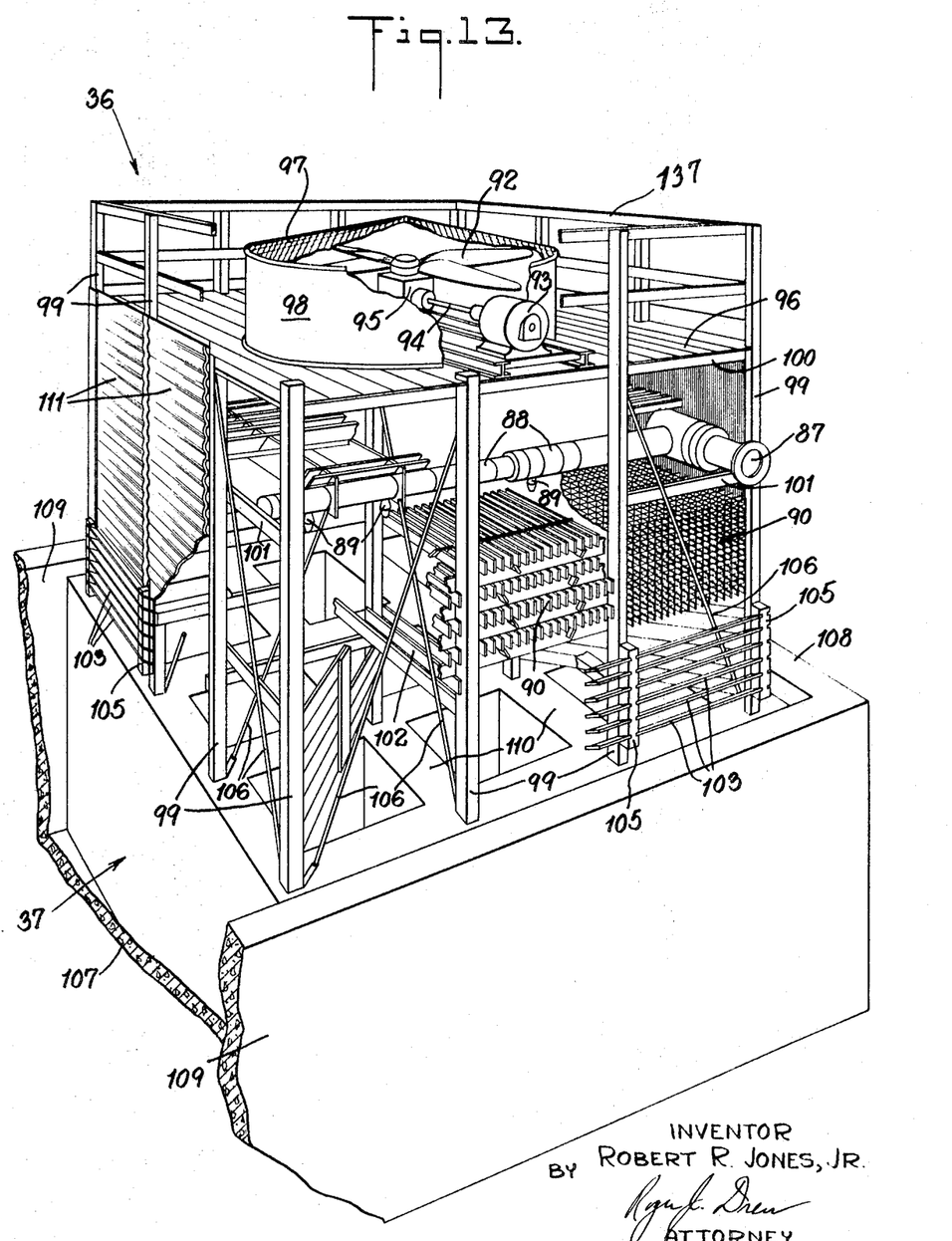
FIG. 13 is a perspective view of a cooling tower of the invention, with parts broken away for purpose of clarity in showing detail.

Louvers 103, removably inserted in spaced apart, angular slots in vertical members 105, extend about the entirety of the tower, and define inlet openings between the louvers for cooling air. Brace rods 106 extend between and are connected to vertical structural members 99. Handrail 137 is provided about the entirety of deck 96. The water distributing pipe 88 above the filling material was a redwood stave pipe, and the water distributing nozzles 89 were of polypropylene. Fan 92 was an adjustable pitch fan of 497 r.p.m. Brace rods 106 were of steel. The framing material including vertical members 99 and horizontal members 100, 101 and 102 were of redwood. The four sides of tower 36 are completely enclosed from the level of the uppermost row of the louvers 103 to the deck 96 by sidewalls 111 formed of corrugated sheathing, which was a cement-asbestos corrugated board sheathing. Tower 36 had dimensions of length of 12 feet, width of 12 feet, and height of 15 feet 6 inches. Ladder 113, shown in FIG. 3, enables access to the top deck 96 of tower 36.

Figure 6:
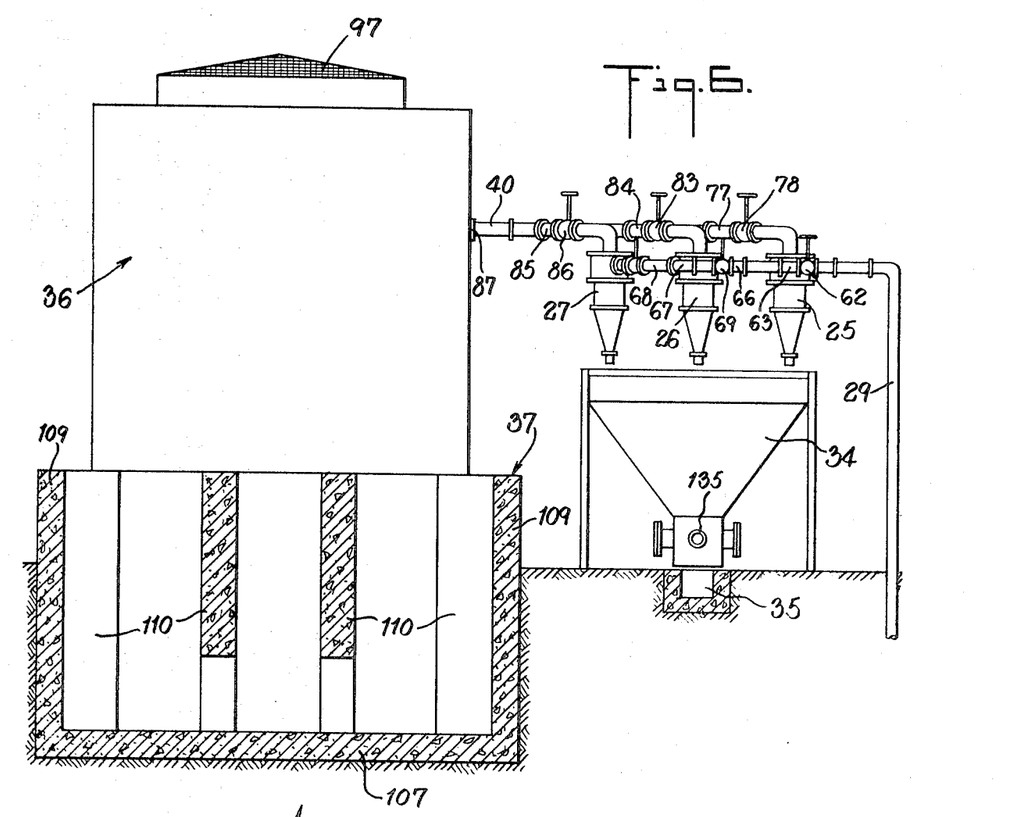
FIG. 6 is a transverse sectional view looking along line 6—6 of FIG. 2.

Basin 37 shown in FIGS. 1–6 is located directly beneath cooling tower 36, and is of greater width and length than tower 36 and extends an appreciable distance laterally from beneath the tower. Basin 37 is defined by bottom wall or base 107, end walls 108 and sidewalls 109. Basin 37, which receives the cooled water from tower 36, was formed by excavating a cavity or depression in the ground generally rectangular in shape and of appreciably greater dimensions than those of the intended basin. The base 107, end walls 108 and sidewalls 109 were then formed in the excavation of reinforced concrete, to provide the basin. As shown in FIGS. 4 and 6, piers 110 of concrete support cooling tower 36. Basin 37 has dimensions of length of 35 feet, width of 15 feet, and height of 9 feet 3 inches at one end and 9 feet 9 inches at the other end, the bottom sloping 6 inches in the 35-foot length.

As shown in FIG. 5, in another preferred embodiment, float member 114 adapted to float on the surface 115 of cooled water in water basin 37, is connected by mechanical linkage 116 to valve 117 of makeup water supply pipe 118. When the water level in the basin falls to a predetermined lower level 119 therein, float member 114 by reason of dropping the corresponding distance actuates linkage 116 to open valve 117 whereby makeup water is supplied to basin 37, so as to bring the water level back to that desired so as always to assure an adequate supply of relatively cool water in the basin for supply to the granulating jet nozzles 18 and 19 previously referred to herein. When float member 114 again reaches the predetermined upper water level 115, it actuates linkage 116 to close valve 117 in water supply pipe 118 with consequent cessation of water supply to the basin. Upper and lower water levels 115 and 119 respectively are illustrative only and other predetermined upper and lower levels of the water in basin 37 could be employed herein for closing off and initiating supply of makeup water to basin 37 by means of a float-controlled valve in the makeup water supply pipe. Water supply pipe 120 is connected to supply pipe 118 through Tee 122. Pipe connection 123 is also connected to supply pipe 120 through an elbow and Tee 122 and is used as a hose connection for cleaning the basin 37 and other equipment when desired. Water meter 124 is provided in pit 125, also shown in FIG. 3, which is formed with a concrete base, end and sidewalls, and has a removable wood cover 126 to enable access to the meter.

Figure 3:
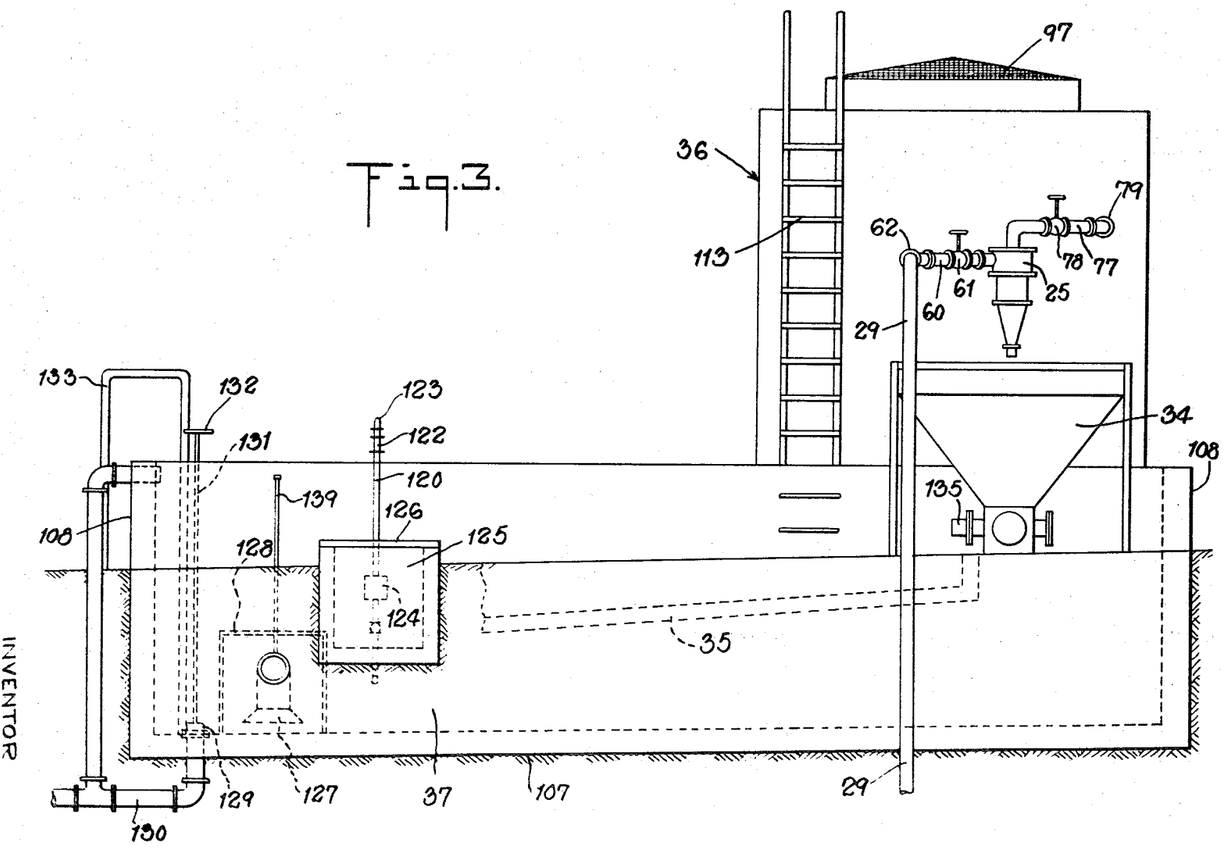
FIG. 3 is a side elevational view looking along line 3—3 of FIG. 2.

Valved outlet 127 for cooled water is completely surrounded by screen 128 to prevent trash or debris that may have fallen into the basin from exiting with the cooled water. As shown in FIG. 3, vent pipe 139 communicates outlet conduit 127 with the atmosphere to vent air from the outlet conduit. Conduit 38 leads from outlet 127, as shown in FIGS. 1, 2 and 5 and leads to one or more pump 39, shown in FIG. 1, with conduit 38a leading from the outlet of pump 39 to conduits 44 and 45 for granulating jet nozzles 18 and 19 respectively. As shown in FIGS. 2 and 3, drains 129 and 137 are provided in the base of basin 37 with drain pipes 130 and 138 respectively communicating therewith to enable draining of the basin when desired. The valve stem and hand wheel of the valve of drain 129 are designated at 131 and 132 respectively in FIG. 3. Ladder 133, shown in FIG. 5, enables access to the bottom of basin 107.

Flume 35, shown in FIGS. 1, 3 and 6, extends from beneath hopper 34 for the fine slag solid particles and receives the fine slag particles and water from outlet nozzle 135 for hopper 34. Flume 35 extends to the desired disposal means for the fine slag particles, and is formed by excavating a trench in the ground which is inclined downwardly in a direction away from hopper 34, and lining the trench with bottom and sidewalls of concrete. Flume 35 has a sufficient slope, typically one-fourth inch in 12 inches, to assure flow of the gritty water therein to the disposal area.

In operation, molten slag flows from the taphole of slag-yielding furnace 15, e.g. a lead blast furnace, and ultimately down launder 16. The lead blast furnace slag has a typical composition of:

| | |
|---|---|
| Lead | 1.41% |
| Copper | 0.30% |
| SiO$_2$ | 22.3% |
| FeO | 26.4% |
| MnO | 1.0% |
| CaO | 19.8% |
| MgO | 1.58% |
| Zn | 17.1% |
| Sulfur | 1.46% |
| Antimony | 0.04% |
| Silver | 0.50 ounces per ton |

The molten slag stream 42, shown in FIG. 9, which is at a temperature of typically 2000° F. is poured or flows off the lower end of launder 16 in the direction of the refractory surface of granulated slag sluicing launder 17. During the passage of the molten slag between launder 16 and launder 17, jet streams of water are injected into launder 17 by jet granulating nozzles 18 and 19 with a trajectory to intercept the molten slag stream at a sufficiently high velocity and in sufficient quantity to granulate the molten slag. Although one jet granulating nozzle is satisfactory for use herein, it is preferred to employ two superposed jet nozzles 18 and 19 and two water jet streams, with the primary function of the jet stream from each nozzle being that disclosed previously herein. More than two jet nozzles can also be employed. Preferably the water jet stream is injected at a jet velocity of about 40 feet per second or greater and in quantity of about 950 g.p.m. or greater for a molten slag feed rate of up to 560 lbs. per minute. The water of the jet stream or streams, which is of relatively low temperature as compared with that of the molten slag, rapidly cools and at least partially solidifies the molten slag of the stream and rapidly disintegrates the molten slag into particles or granules including relatively fine and relatively coarse particles. Steam is generated during the granulation of the molten slag, with at least a major portion of the heat in the slag being dissipated in heating the granulating water and in the steam evolution. The water supplied to jet granulating nozzles 18 and 19 is recirculated from cooling tower basin 37 via conduits 38 and 38a and by means of one or more pump 39, and is at a temperature of typically 104° F. when discharged from nozzles 18 and 19 as the jet streams.

Coarse discrete solid slag particles are removed from the lower portion of settling separation section or pit 22 by bucket elevators 24 and 52, shown in FIG. 11, and discharged from the bucket elevators onto flop gates 53 and 54 and thence to a granulating slag bin (not shown). The action of the bucket elevators on the granulated slag in pit 22 also tends to produce fine slag particles. Prior to startup, settling separation section 22 and adjoining withdrawal section 23 may be prefilled with cold water to about the overflow point (with respect wall 21).

The mixture of hot water and coarse and fine slag particles flowing down launder 17 and into settling separation section or zone 22 of receptacle 20 results in water having a considerable quantity of fine slag particles suspended therein overflowing through discharge opening or openings 22c in wall 21 equipped with screens 22a secured over the discharge openings and into withdrawal section or zone 23. These fine slag particles or slag fines are of typical particle size passing through a 200 mesh to 20 mesh sieve (U.S. Standard Sieve Series). The coarse slag particles settle to the lower portion of settling separation section or pit 22 by reason of their higher specific gravities, and are of typical particle size of one-eighth inch diameter. The water of elevated temperature suspending the slag fines and overflowing wall 21 into withdrawal section 23 has a typical temperature of 140° F.

Water of elevated temperature containing fine slag solid particles suspended therein is withdrawn from withdrawal section 23 by means of pumps 30 and 47, shown in FIG. 11, and passed at a rapid flow rate of typically about 950 g.p.m. and at a temperature of about 140° F. via conduit 29 to the tangentially arranged inlet opening of any one, any two, or all of hydrocyclones 25, 26 and 27, as is required or desired. Thus if it is intended to employ only hydrocyclone 25, then valves 61 and 78 in conduits 60 and 77, shown in FIG. 2, are opened whereas valves 65 and 68 in conduits 64 and 67 respectively and valves 83 and 86 in conduits 84 and 85 respectively are closed. Consequently the elevated temperature water containing the suspended slag fines flows at a high velocity through conduits 29 and 60 only into hydrocyclone 25. Should both hydrocyclones 25 and 26 be utilized, then valves 61 and 65 in conduits 60 and 64 respectively are opened and valves 78 and 83 in conduits 77 and 84 respectively are opened, whereas valves 68 and 86 in conduits 67 and 85 are closed. Should all of hydrocyclones 25, 26 and 27 be utilized, then valves 61, 65 and 68 in conduits 60, 64 and 67 respectively are opened and valves 78, 83 and 86 in conduits 77, 84 and 85 respectively are also opened. To place on stream any other single hydrocyclone or another combination of two of the hydrocyclones 25, 26 and 27 would require merely the opening of the corresponding valves and closing of the other valves and is believed readily understood by one ordinarily skilled in the art.

Figure 8:
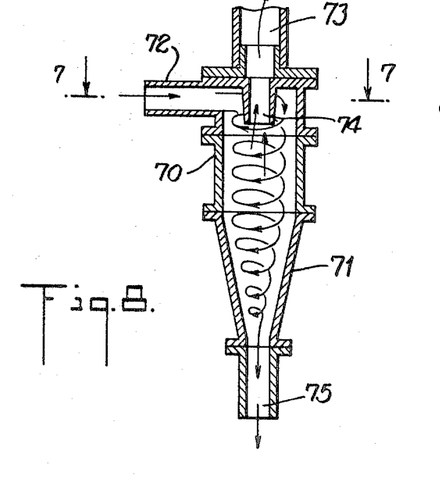
FIG. 8 is a longitudinal elevational section taken on line 8—8 of FIG. 7.

In any of the hydrocyclones 25, 26 and 27, as shown in FIG. 8, the water flowing at high velocity undergoes a rotary or spinning movement in cylindrical upper portion 70 of the hydrocyclone, whereby the heavier fine slag solid particles are thrown by centrifugal force outwardly against the cylindrical wall and gravitate downwardly to discharge opening 75 together with a small quantity of the water. Water of elevated temperature and free or substantially free of slag fines is withdrawn from an upper portion of the hydrocyclone through discharge outlet 74, and as shown in FIG. 1, is passed to the water inlet 87 of cooling tower 36 through common supply conduit 40. The separated slag fines together with a small amount of water is discharged from the hydrocyclone or hydrocyclones through discharge outlet 75, shown in FIG. 8, to hopper 34 shown in FIG. 1. Hopper 34 in turn discharges the gritty water, i.e., mixture of slag fines and water, into flume 35, which conducts the gritty water to a disposal area.

The substantially slag fine-free water of elevated temperature at a temperature of typically about 140° F. enters inlet 87 of cooling tower 36, as shown in detail in FIG. 13, and is conducted to distributor pipe 88. From the distributor pipe 88 the water is distributed through the distributor nozzles 89 onto filling material 90 constituted of the grid of superposed layers of spaced apart slats. The water gravitates or cascades downwardly through the various layers of the filling material countercurrent to an uprising movement of air induced by fan 92 and entering the tower through the openings between the spaced-apart louvers 103. The elevated temperature water is cooled in the tower by direct heat exchange with the cooler air, and by the latent heat of evaporation of water, and passes downwardly from the lower most layer of slats of the grid filling into cooling tower basin 37.

Referring now to FIGS. 1, 2 and 5, cooled water is withdrawn from under the head in cooling tower basin 37 through outlet 127 at a temperature of typically about 104° F. and recirculated via conduits 38 and 38a and 44 and 45 by means of pump 39 to jet granulating nozzles 18 and 19 at the rapid flow rate or high velocity and in the quantity previously disclosed herein.

While certain features of the invention have been disclosed herein, and are pointed out in the annexed claims, it will be understood that, in accordance with the doctrine of equivalents, various omissions, substitutions and changes may be made by those skilled in the art without departing from the spirit of the invention.

What is claimed is:

1. A recirculatory system for the granulation of slag which comprises:
   a. means for granulating a stream of molten slag with aid of a cooling aqueous liquid to obtain a mixture of aqueous liquid of elevated temperature and granulated slag particles;
   b. means for separating the aqueous liquid of elevated temperature and containing fine slag particles suspended therein from coarse slag particles;
   c. at least one hydrocyclone, the hydrocyclone including a cylindrical upper portion, an inlet tangentially positioned in an upper portion of the cylindrical upper portion for the aqueous liquid containing the suspended fine slag particles, an outlet conduit extending axially downwardly within the cylindrical upper portion and terminating in an inlet opening at a level of the hydrocyclone below the level of the aqueous liquid suspended fine slag particle inlet thereof, and an outlet for fine slag particles at the lower portion thereof;
   d. means for withdrawing the separated coarse slag from said separating means;
   e. Conduit means for conducting the separated aqueous liquid containing the fine slag particles suspended therein from said separating means to the hydrocyclone inlet therefor;
   f. means for causing the aqueous liquid suspending the fine slag particles to flow through the conduit means from the separating means to the hydrocyclone inlet therefor at a rapid flow rate;
   g. a cooling tower, said tower including filling material therein, an inlet above the filling material for substantially fine slag particle-free aqueous liquid of elevated temperature, at least one inlet for cooling air, an outlet for cooled aqueous liquid at the lower portion of the tower, and at least one outlet for the air spaced apart from the air inlet;
   h. conduit means for conducting the substantially fine slag particle-free aqueous liquid of elevated temperature from an outlet of the hydrocyclone outlet conduit therefor to the cooling tower inlet therefor;
   i. means for collecting the cooled aqueous liquid from the tower outlet therefor; and
   j. conduit means for conducting the cooled aqueous liquid from the aqueous liquid collecting means back to the molten slag granulating means.

2. The slag granulation system of claim 1 wherein the at least one hydrocyclone is a plurality of hydrocyclones mounted in parallel, with valve means in the water suspending fine slag particle-conducting conduit means for the hydrocyclones whereby any one, combination of any two or more but less than all when more than two hydrocyclones are utilized, or all of the hydrocyclones can be placed on stream.

3. The system of claim 1 wherein each hydrocyclone has a conical lower portion connected to the cylindrical upper portion thereof.

4. A jet recirculatory system for the granulation of nonferrous metal slag which comprises:
   a. means for pouring molten nonferrous metal slag in the direction of a surface;

b. at least one jet nozzle for injecting at least one jet stream of water with a trajectory intercepting the molten slag and at a sufficiently high velocity and in sufficient quantity to granulate the molten slag into particles including coarse and fine slag particles;

c. means hereinafter specified for supplying cooled water to the one or more jet nozzles at sufficiently high velocity and in sufficient quantity to enable the trajectory and molten slag granulating of (b) aforesaid;

d. means for separating water of elevated temperature and containing the fine slag particles suspended therein from the coarse slag particles;

e. at least one hydrocyclone, the hydrocyclone including a cylindrical upper portion, an inlet tangentially positioned in the cylindrical upper portion for the water containing the fine slag particles suspended therein, an outlet duct extending axially downwardly within the cylindrical upper portion and terminating in an inlet opening at a level of the hydrocyclone below the level of the inlet for the fine slag particle-suspending water, and an outlet for fine slag solid particles at the lower portion thereof;

f. means for withdrawing the separated coarse slag solid particles from said separating means;

g. conduit means for conducting the separated water containing the fine slag solid particles suspended therein from said separating means to the hydrocyclone inlet therefor;

h. pump means for causing the water suspending the fine slag solid particles to flow through the conduit means from the separating means to the hydrocyclone inlet therefor at a rapid flow rate;

i. a cooling tower, said tower including filling material therein, an inlet above the filling material for substantially slag fine solid particle-free water of elevated temperature, at least one inlet for cooling air, an outlet for cooled water at the lower portion of the tower, and at least one outlet for the air spaced apart from the air inlet;

j. separate conduit means for conducting the substantially fine slag solid particle-free water of elevated temperature from the hydrocyclone outlet conduit therefor to the cooling tower inlet;

k. basin means below the tower cooled water outlet for receiving and collecting the cooled water therefrom;

l. separate conduit means for conducting the cooled water from the basin means back to the one or more jet nozzles; and m. another pump means for causing the cooled water to flow through the last-mentioned conduit means to the one or more jet nozzles at a sufficiently high velocity and in sufficient quantity for granulating the molten slag into the particles.

5. The jet cyclic system of claim 4 wherein the at least one hydrocyclone is a plurality of hydrocyclones mounted in parallel, with valve means in the water suspending fine slag particle-conducting conduit means for the hydrocyclone whereby any one, combination of any two or more but less than all when more than two hydrocyclones are utilized, or all of the hydrocyclones can be placed on stream.

6. The jet cyclic system of claim 4 wherein each hydrocyclone has a conical lower portion connected to the cylindrical upper portion thereof.

7. The jet cyclic system of claim 5 further characterized by an inclined launder for the mixture of granulated slag particles and granulating water, the launder having a lower discharge end portion positioned over the separating means and an upper end portion, the molten slag pouring means pouring the molten slag in the direction of an inner surface of the upper portion of the launder, the jet nozzle being so positioned as to inject the water jet stream with a trajectory to intercept the molten slag directly over an open upper portion of the launder so that the water and resulting granulated slag will pass into the launder.

8. The jet recirculatory system of claim 7 wherein the means for separating the water containing the fine slag particles suspended therein from the coarse slag solid particles comprises a receptacle and a vertical barrier wall in and dividing the receptacle into a coarse slag particle-settling separation section, and a fine slag particle-suspending water withdrawal section downstream from said separation section, the coarse slag particles settling to a lower portion of the settling separation section and the water containing the suspended fine slag particles flowing through at least one screened discharge opening in the barrier wall and over the opening edge and into the withdrawal section, the water suspending the fine slag particle-conducting conduit means interconnecting said withdrawal section and the hydrocyclone inlet therefor, and means for removing the coarse slag particles from the lower portion of the receptacle settling separation section.

9. The jet recirculatory system of claim 7 further characterized by a makeup water supply valved conduit for furnishing water to the basin means, float valve control means including a float member adapted to float on the surface of the water in the basin means, and means responsive to the fall of the valve control float member on a dropping water surface level therein to below a predetermined lower level of the basin means to thereby open the valve of the makeup water supply conduit to admit makeup water into the basin means until the water surface level therein reaches a predetermined upper level thereof and to close the makeup water supply conduit valve when the water surface level reaches the predetermined upper level of the basin means.

10. The jet recirculatory system of claim 8 wherein the cooling tower is an induced draft cooling tower.

PO-1050
(5/69)

UNITED STATES PATENT OFFICE
CERTIFICATE OF CORRECTION

Patent No. 3,615,329                    Dated  October 26, 1971

Inventor(s)      Robert R. Jones

It is certified that error appears in the above-identified patent and that said Letters Patent are hereby corrected as shown below:

Column 4, line 69, --and-- should be inserted after "inches" and before "curved"; line 72, "particle-setting" should read --particle-settling--. Column 5, line 36, "plate" should read --flat--; line 70 "inches" should read --inch--. Column 10, line 19, --the-- should be inserted after "with" and before "aid"; line 39 "Conduit" should read --conduit--.

Signed and sealed this 11th day of April 1972.

(SEAL)
Attest:

EDWARD M. FLETCHER, JR.
Attesting Officer

ROBERT GOTTSCHALK
Commissioner of Patents